UNITED STATES PATENT OFFICE 2,308,419

METHOD OF MAKING ARALKYL IODIDES AND CORRESPONDING ALCOHOLS

Robert G. Heitz, Antioch, Calif., and John E. Livak, Midland, Mich., assignors to The Dow Chemical Company, Midland, Mich., a corporation of Michigan No Drawing. Application March 12, 1941, Serial No. 383,058

12 Claims. (Cl. 260—651)

This invention concerns a new method of making organic compounds having the general formula:

R—$C_nH_{2n}$—Y wherein R represents an aromatic radical, Y represents iodine or the hydroxyl group, and $n$ is 2 or 3. It particularly concerns the preparation of beta-phenylethyl iodide and beta-phenylethyl alcohol. The invention also concerns certain new aralkyl iodides, preparable by the new method and having the general formula:

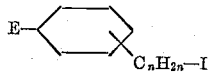

wherein E represents chlorine, bromine, or an alkyl radical.

We have found that olefine halo-iodides having the general formula:

X—$C_nH_{2n}$—I wherein X represents chlorine or bromine, may be reacted with aromatic compounds in the presence of an aluminum chloride-containing catalyst to form the corresponding beta-aryl-alkyl iodides, which reaction involves the selective removal of the chlorine or bromine substituent leaving the iodine substituent intact. The selective reaction which takes place is illustrated by the following equation for the reaction between ethylene chloriodide and benzene to form beta-phenylethyl iodide:

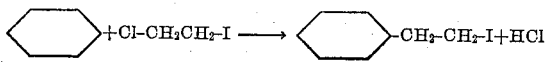

We have further found that the aralkyl iodides may be hydrolyzed to form corresponding aralkyl alcohols in good yield.

Although ethylene chloriodide, ethylene bromiodide, propylene chloriodide, or propylene bromiodide may be reacted with a variety of aromatic compounds capable of being alkylated by a Friedel-Crafts reaction, e. g. benzene, toluene, xylene, ethylbenzene, chlorobenzene, etc., to form corresponding aralkyl iodides, the yields vary considerably with changes in the reactants employed and the other conditions under which the reaction is carried out. Ethylene chloriodide reacts more smoothly than propylene chloriodide and the latter reacts more smoothly than propylene bromiodide with aromatic compounds. Ethylene chloriodide also reacts more readily than ethylene bromiodide with aromatic compounds, but aryl-ethyl iodides may be produced in good yield using either of said reactants. Furthermore, ethylene chloriodide and ethylene bromiodide react more readily and satisfactorily with benzene to form beta-phenylethyl iodide than with the other aromatic compounds just mentioned to form the corresponding aryl-ethyl iodides.

Aluminum chloride is far superior to other Friedel-Crafts catalysts such as aluminum bromide, ferric chloride, the mercury-aluminum couple, acid-activated bleaching earths, etc., in promoting the reaction, but mixtures of aluminum chloride with such other catalysts may satisfactorily be used.

The yield of aralkyl iodide product is influenced markedly by the relative proportions of aluminum chloride catalyst and olefine haloiodide reactant in the reaction mixture at any instance. Aluminum chloride, when admixed directly with the olefine halo-iodide causes rapid decomposition of the latter. It has this same effect and also that of causing other side reactions, e. g. the formation of ethylene iodide, dibenzyl, etc., if present in the reaction mixture in a proportion greatly in excess of that necessary to cause reaction. The exact proportion of aluminum chloride required is of course dependent upon its catalytic activity, which may vary appreciably from one lot of aluminum chloride to another, but in most instances the presence of 0.001 mole of fresh aluminum chloride per mole of the olefine halo-iodide is sufficient. In this connection, we have observed that the aluminum chloride rapidly loses its catalytic activity as the reaction progresses, hence it is preferably added continuously or in small portions during the reaction. It may conveniently be added in dissolved form, e. g. as a solution thereof in the aromatic reactant or in an inactive or relatively inactive solvent such as trichlorobenzene, cyclohexane, ligroin, etc.

The reactants and catalyst may be admixed in any of several ways, but the mode of mixing the reaction ingredients may influence the yield of aralkyl iodide product. Substantial yields of aralkyl iodides have been obtained by gradually adding aluminum chloride at the rate necessary for rapid reaction to a mixture of the reactants and also by forming a mixture of the reactants and catalyst at a temperature below that necessary for rapid reaction, e. g. at —10° C. or lower, and warming the mixture to a temperature at which rapid reaction occurs. However, when operating in these ways, it may be difficult to obtain substantially complete reaction of the olefine halo-iodide and at the same time avoid the formation of by-products such as ethylene iodide, dibenzyl, etc., in substantial amounts. The reaction is most satisfactorily carried out by gradually admixing a solution of aluminum chloride and the aromatic reactant with the olefine halo-iodide while limiting as nearly as possible, the rate at which aluminum chloride is thus added to that required for rapid reaction.

The proportions of the reactants may be varied considerably, but when using them in certain proportions the presence of a solvent may be required in order to obtain rapid reaction. We preferably employ from 1.5 to 5 moles or more of the aromatic reactant per mole of the olefine halo-iodide. Peculiarly, when operating in the absence of a solvent or diluent, the reaction becomes sluggish and decomposition of the olefine halo-iodide may occur, as the molecular ratio of the aromatic reactant to the ethylene halo-iodide is reduced from 3 or above to about 1.5 or lower. However, by diluting the reaction mixture with an inert, or a relatively non-reactive solvent such as trichlorobenzene or a saturated hydrocarbon solvent, etc., the reaction may be carried out even when using less than 1.5 moles of the aromatic reactant per mole of olefine halo-iodide.

The reaction is usually carried out at temperatures between room temperature and the boiling point of the mixture, preferably at 50° C. or higher, but it may in some instances be carried out at considerably lower temperatures, e. g. at temperatures as low as —5° C.

After completing the reaction, the catalyst is removed or rendered inactive in any of the usual ways, e. g. by treatment with water or an alkaline compound, or by washing with an aqueous solution of an acid or an alkali, and the aralkyl iodide product is separated, e. g. by distillation. By operating in accordance with the preferred conditions hereinbefore given, aralkyl iodides may be produced in substantial yields and aryl-ethyl iodides in particular may be obtained in good yields. When the preferred reaction conditions are not strictly observed, by-products such as ethylene iodide and di-aryl-ethane may be formed in substantial amounts. These by-products are themselves valuable materials and may in some instances be desired.

The aralkyl iodides thus obtained are useful as chemical agents from which other organic compounds, particularly the corresponding alcohols, e. g. beta-aryl-ethyl alcohols, may be prepared. The alcohols are prepared by hydrolyzing the aralkyl iodides with water in the presence of alkaline hydrolyzing agents. The hydrolysis is usually carried out in a bomb or autoclave at temperatures between 100° and 200° C., but temperatures outside this range may sometimes be employed. As the hydrolyzing agent we preferably use powdered calcium carbonate, although other weak alkalies such as sodium bicarbonate, potassium bicarbonate, etc., may be employed. After completing the hydrolysis, the alcohol product is separated and purified in accordance with usual purification procedure, e. g. by mechanical separation and extraction from the water and subsequent distillation. Beta-phenyl-ethyl alcohol has been produced in greater than 90 per cent yield by such hydrolysis of beta-phenyl-ethyl iodide.

The following examples describe certain ways in which the principle of the invention has been applied, but are not to be construed as limiting its scope.

*Example 1*

A mixture of 390 grams of benzene, 50 grams of ligroin, and 6.6 grams of aluminum chloride was cooled to —5° C. and, while maintaining the mixture at said temperature, 191 grams of ethylene chloriodide was added with stirring in 10 minutes. A rapid reaction, accompanied by evolution of hydrogen chloride from the mixture, took place during the addition. The evolution of hydrogen chloride subsided within a few minutes. The mixture was washed successively with an aqueous hydrochloric acid solution and water and was then distilled. The fraction distilling at temperatures between 124° and 129° C. at 20 millimeters absolute pressure was beta-phenylethyl iodide of good quality. The yield of betal-phenylethyl iodide was approximately 45 per cent of theoretical, based on the ethylene chloriodide employed.

*Example 2*

A solution of 390 grams of benzene and 190.5 grams of ethylene chloriodide was heated under reflux to 80° C. and a solution of approximately 0.2 gram of aluminum chloride in 100 cubic centimeters of benzene was added with stirring in 10 minutes. The reaction subsided shortly after completing the addition. The beta-phenylethyl iodide product was separated as in Example 1. The yield was approximately 44 per cent of theoretical, based on the ethylene chloriodide consumed.

*Example 3*

A solution of 190.5 grams (1 gram mole) of ethylene chloriodide and 390 grams of benzene was heated under reflux to 80° C. and a solution of 0.7 gram of aluminum chloride in 300 cubic centimeters of benzene was added with stirring in 30 minutes. The hydrogen halide evolved was collected and served as a measure of the extent of the reaction. The reaction subsided shortly after the aluminum chloride solution was added. Only 0.257 gram mole of hydrogen halide had been evolved. The mixture was washed successively with aqueous hydrochloric acid solution and water to remove the catalyst and was then dried and distilled under vacuum. As the fraction distilling at temperatures between 124° and 128° C. at 20 millimeters pressure there was obtained 57.6 grams (0.247 mole) of beta-phenylethyl iodide. The yield was 96 per cent of theoretical, based on the hydrogen halide evolved.

*Example 4*

To 234 grams of benzene, heated under reflux to approximately 80° C., there was added 92.5 grams of ethylene chloriodide and a solution of 0.75 gram of aluminum chloride in 290 grams of benzene. The ethylene chloriodide and the aluminum chloride solution were added simultaneously over a period of 30 minutes. During the addition a reaction accompanied by evolution of hydrogenhalide occurred, but the reaction subsided shortly after the addition was completed. Approximately 0.43 gram mole of hydrogen halide was evolved. The product was separated as in Example 3. There was obtained 53.8 grams of beta-phenylethyl iodide. The yield was 53.7 per cent of theoretical, based on the hydrogen halide evolved.

*Example 5*

A mixture of 195 grams of benzene and 117.5 grams of ethylene bromiodide was heated under reflux at 80° C. To the heated mixture there was added, over a period of 40 minutes, a solution of 0.3 gram of aluminum chloride in about 150 grams of benzene. During the addition a reaction with evolution of hydrogen halide (mostly hydrogen bromide) occurred, but the reaction subsided shortly after the aluminum chloride had been added. Approximately 0.1445 gram mole of hydrogen halide was evolved. The product was separated as in Example 3. There was obtained 33.4 grams (0.1434 gram mole) of beta-phenylethyl iodide. The yield was 99.3 per cent of theoretical, based on the hydrogen halide evolved.

*Example 6*

A mixture of 184 grams of toluene and 95.2 grams of ethylene chloriodide was heated under reflux at 110° C. and a solution of 0.1 gram of aluminum chloride in approximately 30 grams of toluene was added over a period of 5 minutes. The reaction which occurred subsided shortly after the aluminum chloride had been added. Approximately 0.25 gram mole of hydrogen halide (mostly hydrogen chloride) was evolved. The mixture was washed successively with aqueous hydrochloric acid solution and water to remove the aluminum chloride, dried, and distilled. As the fraction distilling at 130–148° C. at 5 millimeters absolute pressure, there was obtained 24.5 grams (0.1 gram mole) of beta-tolyl-ethyl iodide. The yield was 39.7 per cent of theoretical, based on the hydrogen halide evolved. The beta-tolyl ethyl iodide product is believed to be a mixture of isomers having the general formula:

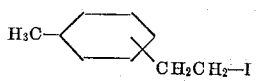

*Example 7*

A mixture of 450 grams of chlorobenzene and 190.5 grams of ethylene chloriodide was heated under reflux to 105° C. and a solution of 0.27 gram of aluminum chloride in approximately 46 grams of chlorobenzene was added in dropwise manner over a period of 7 minutes. The reaction which occurred subsided shortly after the aluminum chloride was added. Approximately 0.5 gram mole of hydrogen halide (mostly hydrogen chloride) was evolved during the reaction. The mixture was washed successively with aqueous hydrochloric acid and water, dried, and fractionally distilled. As the fraction distilling at 130°–145° C. at 5 millimeters absolute pressure, there was obtained 73.8 grams (0.276 gram mole) of beta-chlorophenylethyl iodide. The yield was 55.3 per cent of theoretical, based on the hydrogen halide evolved. The chlorophenyl-ethyl iodide product was obtained as a nearly colorless liquid. It is believed to be a mixture of isomers having the general formula:

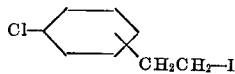

*Example 8*

A mixture of 102.2 grams (0.5 mole) of propylene chloriodide (prepared by reacting iodine chloride, ICl, with propylene) and 195 grams of benzene was heated to 82° C. and a solution of 0.25 gram of aluminum chloride in 114.5 grams of benzene was added gradually over a period of 25 minutes. Approximately 0.402 gram mole of hydrogen halide (mostly hydrogen chloride) was evolved. The product was separated from the reacted mixture as in Example 7. There was obtained 39 grams (0.157 mole) of iodo-propyl benzene distilling at 125°–135° C. at 15 millimeters absolute pressure. The product is a liquid compound having probably the formula:

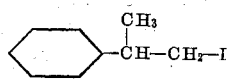

*Example 9*

A mixture of 102.2 grams (0.5 mole) of propylene chloriodide (prepared from propylene and iodine chloride) and 230 grams of toluene was heated to 90° C. and a solution of 0.1 gram of aluminum chloride in 29 grams of toluene was added dropwise in 15 minutes. Approximately 0.41 gram mole of hydrogen chloride was evolved during the reaction. The product was separated as in Example 7. There was obtained 47.5 grams (0.183 mole) of iodo-propyl-toluene distilling at temperatures between 128° and 145° C. at 10 millimeters absolute pressure. The product is a liquid compound having probably the formula:

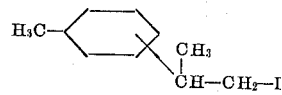

*Example 10*

A mixture of 232 grams (1 gram mole) of beta-phenyl-ethyl iodide, about 500 grams of water, 150 grams of freshly prepared calcium carbonate powder, and about 0.5 gram of Dreft (a mixture of sodium sulphate and sodium salts of higher mono-alkyl sulphates) was heated with stirring in an autoclave at a temperature of 150° C. for 7 hours and 15 minutes. The autoclave was then cooled and the charge removed. Beta-phenyl-ethyl alcohol was then separated from the mixture by usual purification procedure, i. e. separation of the undissolved alcohol product, extraction of dissolved alcohol from the aqueous layer and purification by distillation. The yield of beta-phenylethyl alcohol was approximately 90 per cent of theoretical, based on the phenylethyl iodide employed.

Other aralkyl iodides and the corresponding alcohols may be prepared by the method herein disclosed. For instance, ethylene chloriodide or ethylene bromiodide may be reacted:—with bromobenzene to form beta-(bromophenyl-)-ethyl iodide; with ethylbenzene to form beta-(ethylphenyl-)ethyl iodide, etc. The aralkyl iodides may be hydrolyzed to obtain corresponding alcohols.

Other modes of applying the principle of the invention may be employed instead of those explained, change being made as regard the method herein disclosed, provided the step or steps stated by any of the following claims or the equivalent of such stated step or steps be employed.

We therefore particularly point out and distinctly claim as our invention:

1. In a method for making compounds having the general formula:

wherein R represents an aromatic radical and $n$ is one of the integers 2 and 3, the step which consists in reacting an olefine halo-iodide having the formula:

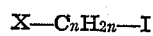

wherein X represents a halogen selected from the class consisting of chlorine and bromine and $n$ is one of the integers 2 and 3, with an aromatic compound in the presence of an aluminum chloride-containing catalyst to form a corresponding iodo-alkyl aromatic compound.

2. In a method for making compounds having the general formula:

$$R—C_nH_{2n}—I$$

wherein R represents an aromatic radical and $n$ is one of the integers 2 and 3, the step which consists in reacting an olefine halo-iodide having the formula:

$$X—C_nH_{2n}—I$$

wherein X represents a halogen selected from the class consisting of chlorine and bromine and $n$ is one of the integers 2 and 3, with an aromatic compound in the presence of an aluminum chloride-containing catalyst, the latter being employed in amount not greatly exceeding that required to promote the reaction.

3. In a method for making compounds having the general formula:

$$R—C_nH_{2n}—I$$

wherein R represents an aromatic radical of the benzene series and $n$ is one of the integers 2 and 3, the step which consists in reacting an olefine halo-iodide having the formula:

$$X—C_nH_{2n}—I$$

wherein X represents a halogen selected from the class consisting of chlorine and bromine and $n$ is one of the integers 2 and 3, with an aromatic compound of the benzene series in the presence of an aluminum chloride-containing catalyst, the olefine halo-iodide reactant being employed in amount not exceeding the molecular equivalent of the aromatic reactant and the catalyst being employed in amount not greatly exceeding that required to promote the reaction.

4. In a method for making compounds having the general formula:

$$R—C_nH_{2n}—I$$

wherein R represents an aromatic radical of the benzene series and $n$ is one of the integers 2 and 3, the step which consists in reacting an olefine chloriodide having the formula:

$$Cl—C_nH_{2n}—I$$

wherein $n$ is one of the integers 2 and 3, with an aromatic hydrocarbon of the benzene series in the presence of an aluminum chloride-containing catalyst, the aromatic reactant being employed in amount exceeding the molecular equivalent of the olefine chloriodide and the catalyst being added gradually during the reaction in amounts not greatly exceeding those required to promote the reaction.

5. In a method for making a compound having the general formula:

$$R—CH_2CH_2—I$$

wherein R represents an aromatic radical of the benzene series, the step which consists in reacting an ethylene haloiodide having the formula:

$$X—CH_2CH_2—I$$

wherein X represents a halogen selected from the class consisting of chlorine and bromine, with an aromatic compound of the benzene series in the presence of an aluminum chloride-containing catalyst, the ethylene halo-iodide reactant being employed in amount not exceeding the molecular equivalent of the aromatic reactant and the catalyst being employed in amount not greatly exceeding that required to promote the reaction.

6. In a method for making a compound having the general formula:

$$R—CH_2CH_2—I$$

wherein R represents an aromatic radical of the benzene series, the steps which consists in reacting an ethylene halo-iodide having the formula:

$$X—CH_2CH_2—I$$

wherein X represents a halogen selected from the class consisting of chlorine and bromine, with an aromatic compound of the benzene series in the presence of an aluminum chloride-containing catalyst and an excess of said aromatic compound over that required by the reaction, the catalyst being initially employed in amount sufficient to start the reaction and thereafter being added at a rate not greatly exceeding that required to continue the reaction.

7. In a method for making beta-phenylethyl iodide, the step which consists in reacting an ethylene halo-iodide having the formula:

$$X—CH_2CH_2—I$$

wherein X represents a halogen selected from the class consisting of chlorine and bromine, with benzene in the presence of an aluminum chloride-containing catalyst, the latter being employed in a proportion not greatly exceeding that required to promote the reaction.

8. In a method of making beta-phenylethyl iodide, the steps which consist in dissolving aluminum chloride in benzene, gradually admixing the solution with an ethylene halo-iodide having the general formula:

$$X—CH_2CH_2—I$$

wherein X represents a halogen selected from the class consisting of chlorine and bromine, whereby a reaction accompanied by generation of hydrogen halide occurs, controlling the rate at which aluminum chloride is thus brought into admixture with the ethylene halo-iodide and benzene so that the proportion of aluminum chloride in the reaction mixture does not greatly exceed that required to promote the reaction, and thereafter separating phenylethyl iodide from the mixture.

9. In a method of making beta-phenylethyl iodide, the steps which consist in dissolving aluminum chloride in benzene, gradually admixing the solution with an ethylene halo-iodide having the general formula:

$$X—CH_2CH_2—I$$

wherein X represents a halogen selected from the class consisting of chlorine and bromine, whereby a reaction accompanied by generation of hydrogen halide occurs, the rate at which the ethylene halo-iodide and the benzene solution of aluminum chloride are admixed being controlled so that the reaction mixture contains at one time not more than 55 per cent by weight of the ethylene halo-iodide reactant and not greatly more aluminum chloride than is required to promote the reaction.

10. In a method of making beta-phenylethyl iodide, the steps which consist in dissolving aluminum chloride in benzene, gradually admixing the solution with ethylene chloriodide while controlling the rate of admixture so that the resultant reaction mixture contains at any one time not more than 55 per cent by weight of ethylene chloriodide and not greatly more aluminum chloride than is required to cause reaction, and thereafter separating beta-phenyl-ethyl iodide from the mixture.

11. The method of making beta-chlorophenyl-ethyl iodide which comprises reacting an ethylene halo-iodide, selected from the class consisting of ethylene chloriodide and ethylene bromiodide, with chlorobenzene in the presence of an aluminum chloride-containing catalyst in amount not greatly exceeding that required to promote the reaction.

12. The method of making beta-tolyl-ethyl iodide which comprises reacting an ethylene halo-iodide, selected from the class consisting of ethylene chloriodide and ethylene bromiodide, with toluene in the presence of an aluminum chloride-containing catalyst in amount not greatly exceeding that required to promote the reaction.

ROBERT G. HEITZ.
JOHN E. LIVAK.